May 5, 1953     A. D. HERBERT     2,637,817
SEALED VARIABLE LENGTH CELL AND POSITIONER
Filed July 27, 1951     2 SHEETS—SHEET 1
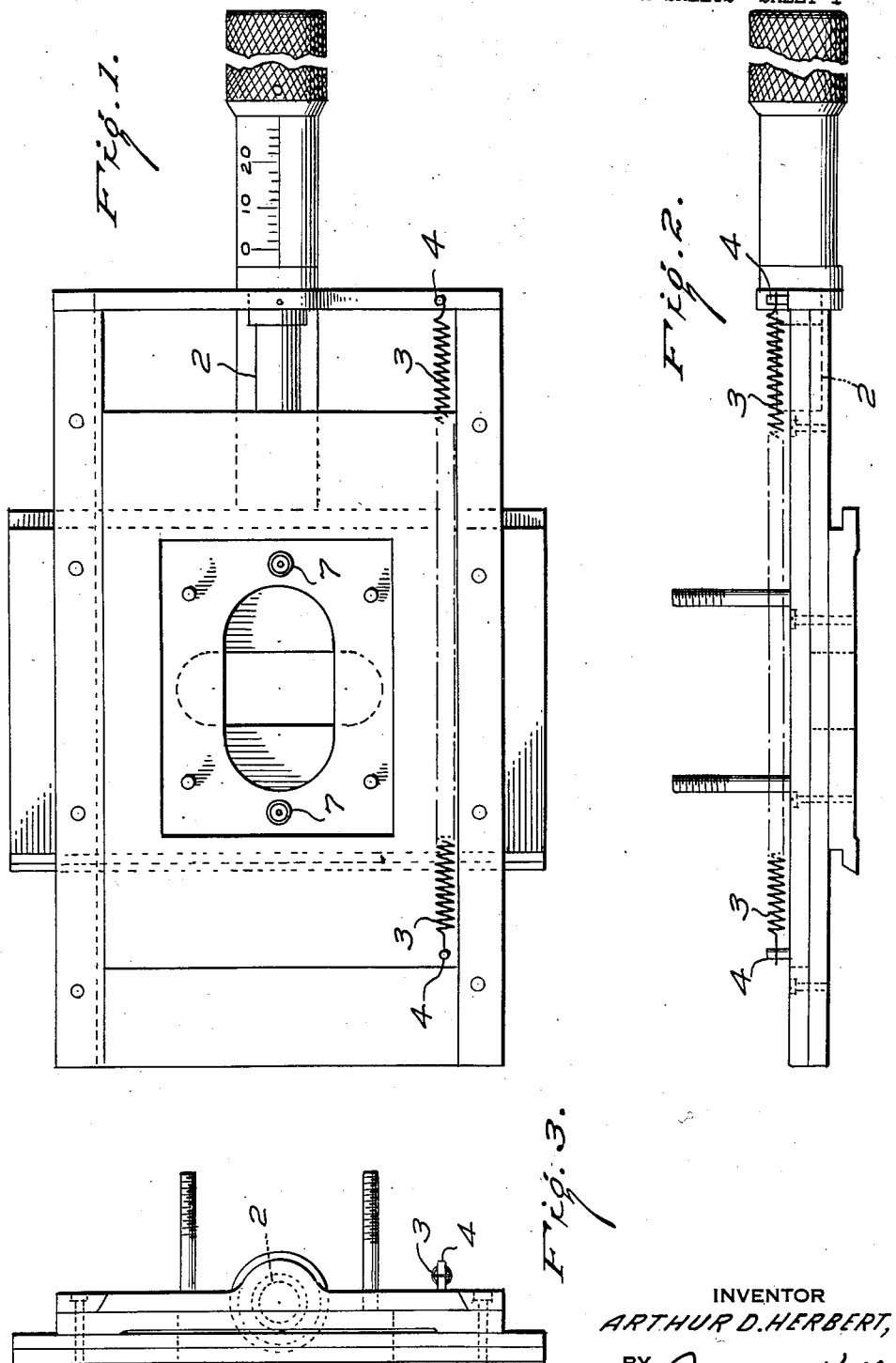
INVENTOR
ARTHUR D. HERBERT,
BY Robert W. Kell
ATTORNEY May 5, 1953     A. D. HERBERT     2,637,817
SEALED VARIABLE LENGTH CELL AND POSITIONER
Filed July 27, 1951     2 SHEETS—SHEET 2

INVENTOR
ARTHUR D. HERBERT,
BY Robert W. Kell
ATTORNEY

Patented May 5, 1953

2,637,817

UNITED STATES PATENT OFFICE 2,637,817

SEALED VARIABLE LENGTH CELL AND POSITIONER

Arthur Donald Herbert, New Brunswick, N. J., assignor to American Cyanamid Company, New York, N. Y., a corporation of Maine Application July 27, 1951, Serial No. 238,953

2 Claims. (Cl. 250—43.5)

This invention relates to a variable length sealed cell, more particularly, a cell of alkali metal halide for infrared spectroscopic work.

In infrared spectrometers, the length of path through the material to be examined is often an important factor and is particularly so with liquids. Variable length cells have been proposed in which the length of the cell is varied by moving a piston. These cells have suffered from several drawbacks. The problem of a movable infrared transparent piston is a serious one and leakage or sticking due to corrosion has rendered the cells short-lived and, in general, not very satisfactory although when the cell is new, useful infrared spectrograms can be made.

The present invention operates on a different principle, namely, that of a wedge in which illumination is transverse of the cell instead of along the length of the cell. The cells of the present invention are prepared easily by holding together two flat plates of suitable material, one of the plates or blocks being provided with a wedge-shaped depression. For work in the infrared region, these plates may be formed of various alkali metal halides. The blocks are contained in a mounting in which they are maintained in contact under spring pressure. The cell holder can then be incorporated in suitable micrometrically movable frameworks to permit very precise movement of the cell across an infrared beam.

The cells of the present invention possess a number of important advantages. In the first place, they are completely sealed and are useful with any type of liquid, regardless of its volatility. The thickness of film can be varied precisely by micrometric movement of the cell across an infrared beam and the rate at which cell thickness varies with movement can be changed at will by varying the slope of the wedge-shaped depression in one of the two cell blocks. It is thus possible to produce cells of any desired wedge angle.

It is of course possible to provide a wedge-shaped depression in each of two cell-blocks and these can then be inverted to give a workable cell of much greater variable thickness. This has the advantage of being able to use thinner cells, resulting in economy of space and expense.

Another important advantage of the cells of the present invention is that the problem of sealing is completely solved. The spring mounting provides a tight seal at all times and there is no problem of moving parts which renders the ordinary type of piston cell unsatisfactory.

A further important advantage of the present invention is that the cell blocks are extremely cheap to produce. There is no necessity of special shapes as in cells with transparent pistons. This is an important factor, because the alkali metal halide cells used in infrared work are extremely sensitive to moisture and a cell which is relatively cheap thus reduces very materially replacement costs.

Another advantage of the cells of the present invention is that measurement of different film thicknesses of liquids is possible without removing the cell from the instrument. This is an important practical advantage, as many infrared instruments are either evacuated or provided with special dehydrated atmospheres which make it undesirable to open the machine any more than is absolutely necessary. The flat wedge-shaped cells of the present invention lend themselves to multiple mounting, thus, for example, a cell-holding framework may carry a number of cells which can be introduced successively into the infrared beam making it possible to measure a number of samples with a single opening of the machine. With the piston type of cell this is difficult or impossible where precise measurement is required.

While the cells of the present invention are of particular importance in the measurement of liquids, especially volatile liquids, they may also be used for measurement of solids, especially solids such as comminuted solids which do not lend themselves to the production of self-supporting shapes. With most solids it is, of course, possible to prepare the solid in the form of a wedge which does not require a cell of the type covered by the present invention.

The cells of the present invention should not be confused with holders having wedge-shaped depressions which are usable with solids or non-volatile liquids. The perfect sealing obtained by means of the present invention permits handling and measurement in positions which are not possible with open cells and the present invention is therefore definitely limited to sealed cells which can be used in any position. The invention will be described in greater detail in conjunction with the following specific examples in which:

Figure 1 of the drawings is a front elevation of my positioning adaptor and cell carrier with the cell in place;

Figure 2 is a top view of my invention with the cell removed;

Figure 3 is an end view of the positioning adaptor illustrated in Fig. 1 with the cell removed;

Figure 4:
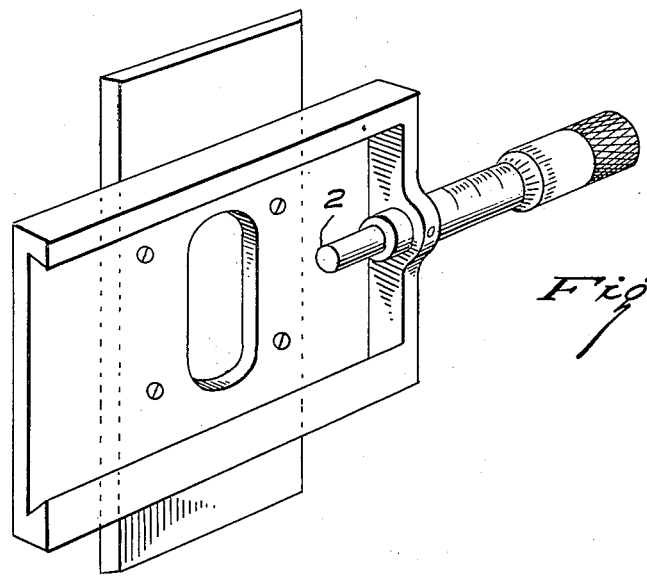
Figure 4 is a view in perspective of the positioning adaptor.

The positioning adaptor illustrated by Fig. 4 is designed to fit into the standard cell opening of an infrared spectrophotometer and modify that apparatus for use with the cell of the present invention. The cell is securely held in the cell carrier by means of cell plate 6, Fig. 6, and 4 machine screws.

Figures 6, 7:
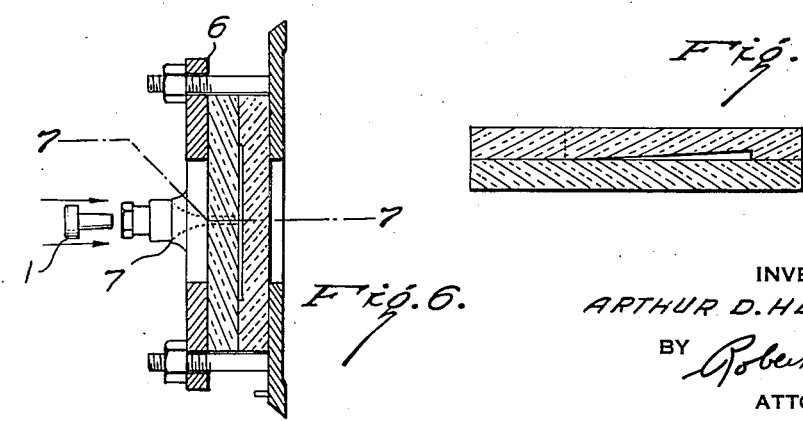
Figure 6 is a detailed sectional view of the cell and carrier taken along the line 6—6 of Fig. 5.
Figure 7 is a sectional view of the cell taken along line 7—7 of Fig. 6.

In determining the infrared absorption of a liquid, alkali metal halide blocks at least one of which contains a wedge-shaped depression, are placed face to face as illustrated in Fig. 7. A lead foil gasket placed between the flat adjacent surfaces of the salt blocks may aid in forming a tight seal, but such a gasket is not required if the contact surfaces of both salt plates are plane and parallel.

Figure 5:
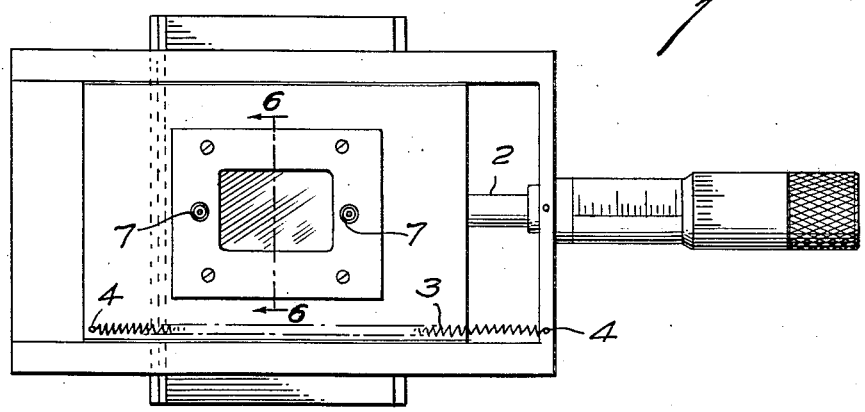
Figure 5 is a side view of the same positioning adaptor with the cell and carrier in place.

The entrance and exit to the cell cavity are provided by two modified hypodermic needles 7 which are sealed into the cell plate as shown in Figs. 5 and 6. The needles are shaped and so placed that when the cell is assembled both needles communicate with the cell cavity. The advantage of such an arrangement in emptying, cleaning and refilling the cell will be readily perceived.

The liquid to be measured may be introduced into the cell cavity by a hypodermic syringe and both the entrance and the exit are then sealed as shown in Fig. 6 by stainless steel plugs 1, ground to fit the needles utilized.

The cell and carrier are then slid into the positioning adaptor as illustrated by Fig. 5 and held against the end of the micrometer screw 2 by means of spring 3 which is slipped over pin 4. The length of the infrared path through the liquid being measured can then be varied at will by proper adjustment of the micrometer screw 2.

In measuring the infrared absorption of solids, a similar procedure is employed. Low-melting solids may be melted and poured into the salt block cavity. When the solid has cooled, the second salt block may be placed in position and the cell carrier assembled. Higher-melting solids may be shaped by grinding methods which are well known.

The mechanical holder and wedge-shaped cell described above enable one to accurately position samples in a light beam normal to the optical axis and accurately measure the absorption of various thicknesses of liquid or solid samples without removing the samples from the instrument. The sample thickness may be easily and rapidly reproduced by reference to the micrometer scale.

My invention is particularly useful in infrared spectrophotometry since the sample may be measured at two thicknesses differing by a known amount, which can be calculated from the slope of the wedge and the micrometer travel. Absolute data such as cell thickness and absorption coefficient may then be readily obtained.

I claim:

1. A cell capable of transmitting infrared light, composed of alkali metal halide plates at least one of which contains a wedge-shaped depression, said plates being so assembled that a sealed wedge-shaped cavity is formed; and communicating means with the apex and base of said wedge-shaped cavity to permit the introduction and removal of liquids from said cavity.

2. An apparatus adapted to move a sealed wedge-shaped cell horizontally across the entrance slit of a spectrometer, the external face of said cell being maintained at all times normal to the optical axis of said spectrometer; which comprises a recessed plate and a cell holder adapted to slide horizontally in said recessed plate; a micrometer screw at one end of said recessed plate aligned parallel to the direction of motion of said cell holder; and spring loading means to maintain said cell holder in contact with the end of said micrometer screw.

ARTHUR DONALD HERBERT.

References Cited in the file of this patent

UNITED STATES PATENTS

| Number | Name | Date |
|---|---|---|
| 171,838 | Munnich | Jan. 4, 1876 |
| 585,694 | Orford | July 6, 1897 |
| 2,545,162 | Mully et al. | Mar. 13, 1951 |